(12) United States Patent
Lueb et al.

(10) Patent No.: US 12,181,383 B2
(45) Date of Patent: Dec. 31, 2024

(54) GAS ANALYSIS SYSTEM FOR ENGAGING A SEALED CONTAINER

(71) Applicant: Kraft Foods Group Brands LLC, Chicago, IL (US)

(72) Inventors: Guus Lueb, Bennekom (NL); Sara Santonastaso, Calahorra (ES); Maria Rosa Viola Zino, Naples (IT); Paola Schiattarella, Naples (IT)

(73) Assignee: Kraft Foods Group Brands LLC, Chicago, IL (US)

( * ) Notice: Subject to any disclaimer, the term of this patent is extended or adjusted under 35 U.S.C. 154(b) by 447 days.

(21) Appl. No.: 17/059,687

(22) PCT Filed: Dec. 23, 2019

(86) PCT No.: PCT/US2019/068254
§ 371 (c)(1),
(2) Date: Nov. 30, 2020

(87) PCT Pub. No.: WO2020/171888
PCT Pub. Date: Aug. 27, 2020

(65) Prior Publication Data
US 2021/0372887 A1  Dec. 2, 2021

(30) Foreign Application Priority Data
Feb. 20, 2019  (IT) .................... 102019000002491

(51) Int. Cl.
*G01N 1/22* (2006.01)
*G01N 21/01* (2006.01)
(52) U.S. Cl.
CPC ........... *G01N 1/2226* (2013.01); *G01N 21/01* (2013.01); *G01N 2001/2229* (2013.01)

(58) Field of Classification Search
CPC ............ G01N 1/02; G01N 1/2226; G01N 2001/1056; G01N 2001/2229; G01N 2001/248; G01N 21/01
(Continued)

(56) References Cited

U.S. PATENT DOCUMENTS

| 3,203,248 A | 8/1965 | Stutler |
| 3,849,070 A | 11/1974 | Garza |

(Continued)

FOREIGN PATENT DOCUMENTS

| DE | 3439778 | 4/1986 |
| JP | H0232240 | 2/1990 |

(Continued)

OTHER PUBLICATIONS

Industrial Italian Patent and Trademark Office, Search Report issued in Italian Application No. IT201900002491, Nov. 7, 2019, 12 pp.
(Continued)

*Primary Examiner* — Sunghee Y Gray
(74) *Attorney, Agent, or Firm* — Fitch, Even, Tabin & Flannery LLP

(57) ABSTRACT

A gas analysis system for engaging a sealed container to withdraw and analyze gas from the sealed container, the system comprising: a penetration implement configured to create an opening to permit withdrawal of gas from the container; a chamber operatively coupled to the penetration implement for receiving gas from the container; a gas analyzer; a seal configured to engage the container to enable the system to maintain an enclosed volume comprising the chamber and an interior of the container after the penetration implement has created an opening in the container; and a mechanism to effect flow of gas from the container to the chamber, and thereafter from the chamber to the gas analyzer, the mechanism comprising a first valve operatively (Continued)

coupled to the penetration implement, and a connection pipe configured to connect with the gas analyzer; wherein the first valve is movable between a first position in which it permits flow of gas from the container to the chamber, and prevents gas from escaping from the enclosed volume or being contaminated, and a second position in which it permits flow of gas from the chamber to the connection pipe and the gas analyzer.

1 Claim, 3 Drawing Sheets

(58) Field of Classification Search
USPC .......................................................... 356/246
See application file for complete search history.

(56) References Cited

U.S. PATENT DOCUMENTS

| | | | |
|---|---|---|---|
| 4,096,734 | A | 6/1978 | Khayat |
| 4,282,182 | A | 8/1981 | Webster |
| 5,098,847 | A | 3/1992 | Welker |
| 5,266,496 | A | 11/1993 | Dacruz |
| 5,277,074 | A | 1/1994 | Poole |
| 5,379,654 | A | 1/1995 | Carvajal |
| 5,528,923 | A | 6/1996 | Ledez |
| 5,578,770 | A | 11/1996 | Welker |
| 5,822,951 | A | 10/1998 | Rosik |
| 6,146,895 | A | 11/2000 | Green |
| 6,395,229 | B1 | 5/2002 | Markelov |
| 9,895,494 | B2 | 2/2018 | Fisher |
| 2009/0084156 | A1* | 4/2009 | Matsuda ............... G01N 1/2226 73/19.1 |
| 2016/0251703 | A1* | 9/2016 | Gilboa-Geffen ... G01N 33/5308 506/1 |

FOREIGN PATENT DOCUMENTS

| | | | | |
|---|---|---|---|---|
| JP | 2014044135 | | 3/2014 | |
| WO | WO-2011151237 | A1 * | 12/2011 | ............... A23F 3/06 |

OTHER PUBLICATIONS

International Searching Authority, Patent Cooperation Treaty, Written Opinion and International Search Report of the International Searching Authority issued in International Application No. PCT/US2019/068254, Mar. 24, 2020, 15 pp.
Presens Precision Sensing GMBH, Products 2017 Catalog, 2017, 133 pp.
Office Action for JP App. No. 2020-560393, mail date Aug. 29, 2023, 5 pages.
Examination Report for AU App. 2019429901, mail date Jan. 31, 2024, 2 pages.

* cited by examiner

GAS ANALYSIS SYSTEM FOR ENGAGING A SEALED CONTAINER

CROSS-REFERENCE TO RELATED APPLICATIONS

This application is a U.S. national phase application filed under 35 U.S.C. 371 § of International Application Number PCT/US2019/068254, filed Dec. 23, 2019, which claims priority from Italy Application Number IT 102019000002491, filed Feb. 20, 2019, which are both hereby incorporated herein by reference in their entirety.

TECHNICAL FIELD

This application relates generally to chemical analysis instruments, and more specifically, to a portable analysis system for withdrawal and real-time analysis of headspace gas.

BACKGROUND

Previously, headspace gas had often been analyzed using in-assembly-line instruments to withdraw a sample, and a gas chromatograph to analyze the sample. However, this has often involved bulky instruments that are not portable and that do not easily allow for testing the headspace in containers at different times during the shelf-life of the product. Other instruments may analyze the headspace in containers but are not adept at withdrawing the headspace gas from a metal container, or a container with a metal closure, without excess leakage and/or dilution of the sample. Therefore, there is a need for a portable instrument that can, at numerous stages of a food product's shelf-life, efficiently withdraw headspace gas from a container, and analyze the gas in real time.

SUMMARY

Described herein is a withdrawal and real-time gas analysis system to analyze headspace gas in containers at different stages in the shelf-life of a food product. The system is portable and includes a penetration implement to create an opening in the container. This opening permits withdrawal of gas from the container, after which it may be received in a chamber coupled to the penetration implement. To help limit or prevent the escape or contamination of the gas, a seal engages the container to enable the system to maintain an enclosed volume comprising the chamber and the container interior after the penetration implement has created an opening in the container. A first gas-tight valve, which may be operatively connected to the seal and to the penetration implement, may further limit the escape or contamination of the gas. A second gas-tight valve may also be provided. The second valve may be movable between a first position in which it directs flow of gas withdrawn by the penetration implement from the container headspace into the chamber, and a second position in which, once the withdrawal and transfer of gas from the container to the chamber is complete, it may direct gas from the chamber to a gas analyzer through a connection pipe.

In some embodiments, the gas analyzer may be a small, lightweight disposable gas detection tube. In other embodiments, the gas analyzer may comprise an electronic device or meter which provides information about a sample in a visible display such as a readable digital display or a color-coded display; an audible signal or report; or other output.

In some embodiments, the system may include an optical sensor system for analysis of the gas sample while the sample remains in the chamber, without any need to transfer the sample from the chamber for analysis.

DETAILED DESCRIPTION

In accordance with one aspect of the present disclosure, a gas analysis system 10 for the real-time withdrawal and analysis of headspace gas in a sealed container 12 is provided herein. The gas analysis system 10 may be portable, and more specifically may be handheld, so that the system 10 may easily access containers during production and at different stages in the shelf-life of a food product. In some embodiments, the system's weight may be less than about 1100 g, less than about 1050 g, less than about 300 g, or less than about 250 g. In some embodiments, the system's length may be less than about 50 cm, less than about 40 cm, or less than about 30 cm. In some embodiments, the system's width may be less than about 50 cm, less than about 40 cm, less than about 30 cm, or less than about 20 cm.

Figure 1:
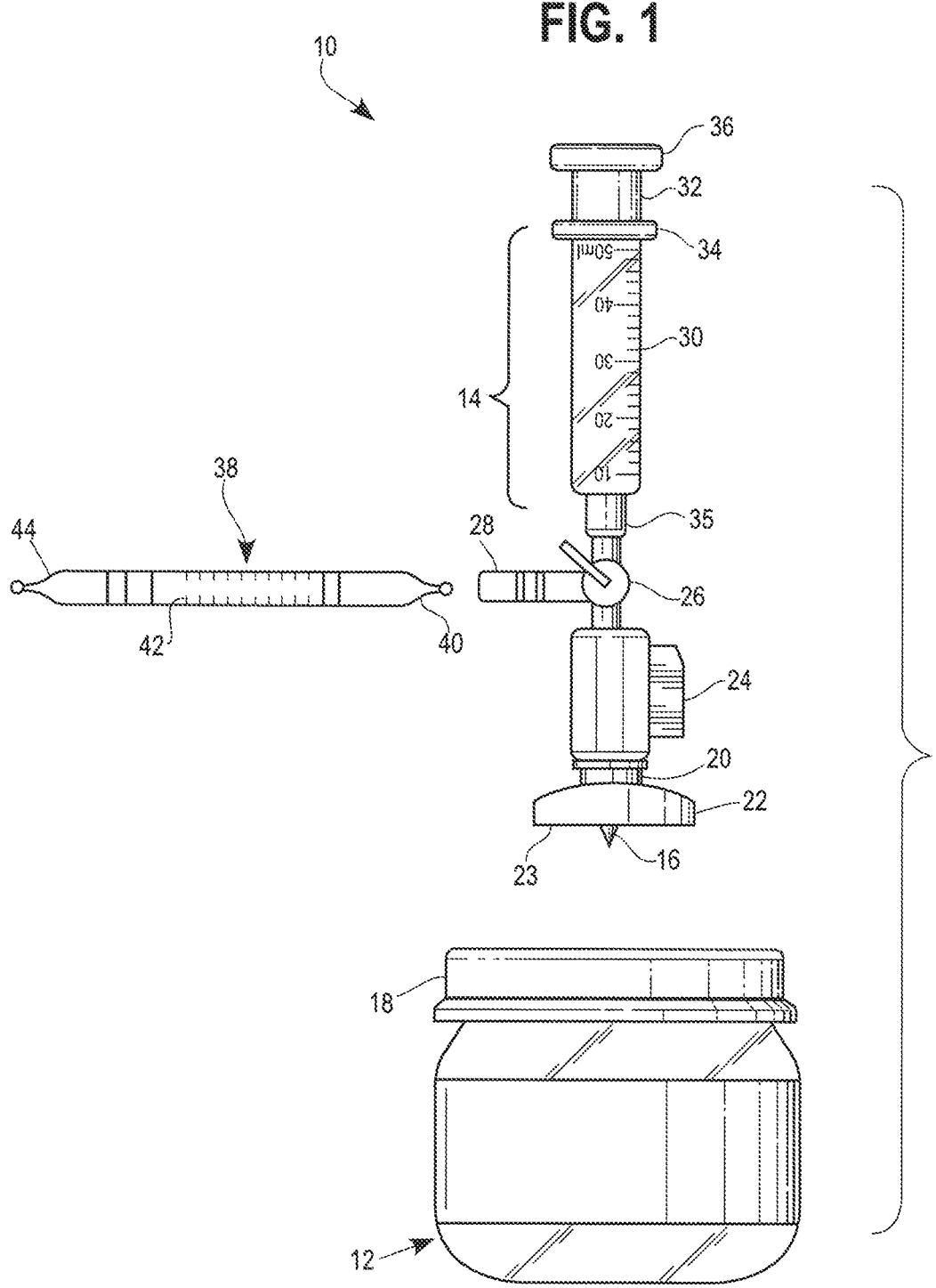
FIG. 1 illustrates a first embodiment of a gas analysis system.

With reference to FIG. 1, the illustrated gas analysis system 10 includes a chamber 14 with a penetration implement 16 operatively coupled to the chamber 14. The penetration implement 16 is configured to penetrate or puncture the closure 18 of a container 12 and to withdraw the headspace gas from the container. In some embodiments, the closure of the container may be made from a material comprising one or more metals such as steel, stainless steel, tin or aluminum, and/or a plastic or polymeric material such as polyethylene or polypropylene. In some embodiments, the closure may have a laminated construction comprising layers of two or more of the above materials and/or other materials. In some embodiments, the closure may comprise the tin plate lid of a jar. In some embodiments, the penetration implement 16 may be a through hole punch or a needle with a beveled tip, a square tip, a blunt tip, a conical tip, or a domed tip. In some embodiments, the penetration implement 16 may have the strength and sharpness to penetrate a metal closure, such as the tin plate lid of a jar, such as, for example, a baby food jar.

The penetration implement 16 may be operatively secured to a first valve 24 by a Luer lock connector 20, which may allow for a substantially leak-free connection between the penetration implement and the chamber. In some embodiments, such a Luer lock connector 20 may allow for replacement of the penetration implement after a single use. In some methods of use, however, the penetration implement may be reused for multiple containers. In some embodiments, connectors other than a Luer lock may be employed. Such connectors may include, e.g., quick-disconnect mechanisms, threaded connectors, or other mechanisms.

A seal 22 may surround the penetration implement 16 to prevent loss or escape of gas from the container 12 when the penetration implement produces an opening in the metal closure 18 of the container. In some embodiments, the seal may be a gasket, a suction cup, an O-ring, or a hermetic seal and may be made of one or more of rubber, polytetrafluoroethylene (PHI), fluorosilicone (FVMQ) polyurethane (PUR), or other deformable substances. The seal. 22 may engage the closure 18 prior to the penetration implement 16 contacting the closure. In some embodiments, when the seal 22 engages the closure 18, the seal may cover at least 25%, 40%, 50%, 60%, 70%, 80%, or at least 90% of the surface area of the closure. In some embodiments, the closure has a central "pop-out" or "flip" portion that rapidly flexes or "pops" outward in response to a pressure increase in the container. In some embodiments, the seal 22 has a bottom edge 23 that has a diameter larger than that of the pop-out portion and seals against the closure outside the pop-out portion. In other embodiments, the bottom edge 23 has a diameter smaller than that of the pop-out portion, and seals against the pop-out portion.

In some embodiments, one or more valves may be provided to control flow of gas. In some embodiments, the total length of the chamber, the valve(s), and the penetration implement may be less than about 30 cm. In some embodiments, the total weight of the chamber, the valve(s), and the penetration implement may be less than about 250 g or less than about 220 g.

In the embodiment of FIG. 1, a first valve 24 is operatively associated with the penetration implement 16, the chamber 14, and the seal 22. In some embodiments, the first valve may be a gas-tight rotatable valve, a push button valve, a push-pull valve, or a septum valve.

As also shown in FIG. 1, a second valve 26, which may also be gas-tight, may be operatively connected to the first valve 24 closer to chamber 14. The second valve may allow for the flow of gas from the penetration implement 16 into the chamber. In some embodiments, the second valve 26 may be a three-way valve. In such embodiments, the second valve 26 may also allow flow of the gas between the chamber 14 and a connection pipe 28 or between the penetration implement 16 and the connection pipe but not at the same time In some embodiments, the first valve may be eliminated, and the second valve 26 may be directly connected to the penetration implement 16.

In the embodiment of FIG. 1, the connection pipe 28 is operatively connected to a gas detection tube 38. During use of the system, a first end 40 of the gas detection tube 38 is snapped off, cut off, or otherwise removed manually or otherwise, with or without scissors, pliers or the like, and the open end 40 may then be inserted into the connection pipe 28. Prior to insertion into the connection pipe, the first end 40 may be contacted with an abrasive material, such as sandpaper, to smooth the surface of the first end 40 to help prevent piercing of the connection pipe which may result in leakage of the sample. Ire some embodiments, the gas detection tube may be configured to detect and/or measure concentrations of one or more gases such as hydrogen sulfide, hydrogen, carbon dioxide, or oxygen. In some embodiments, the gas detection tube may have a length of less than about 7 cm, less than about 6 cm, or about 5 cm.

Prior to the penetration implement 16 engaging the metal closure 18 of the container 12, the first valve 24 and/or the second valve 26 may be closed. The first valve 24 may be configured to help the seal 22 prevent loss of gas from the container 12 by creating an enclosed volume when the first valve is in a closed position. The first valve 24 in a closed position may support a pressure deficiency inside the enclosed volume to help ensure the tightness of the seal 22 against the metal closure 18 of the container 12, This tightness in the seal 22 due to a greater pressure outside of the enclosed volume than inside the closed volume may help the seal to hold firm when gas is withdrawn from the container 12.

In some embodiments, the second valve 26 may be connected directly to the Luer lock connector 20 of penetration implement 16 without a first valve 24 between the second valve and the Luer lock connector. In such embodiments, the second valve is operatively connected to the seal, Luer lock connector, and the penetration implement to control the flow between the container and the chamber. In such embodiments, second valve 26 may be configured to help the seal 22 prevent loss of gas from the container 12 by creating an enclosed volume when the second valve is in a closed position. The second valve 26 in a closed position may support a pressure deficiency inside the enclosed volume to help ensure the tightness of the seal 22 against the metal closure 18 of the container 12.

Figure 3:
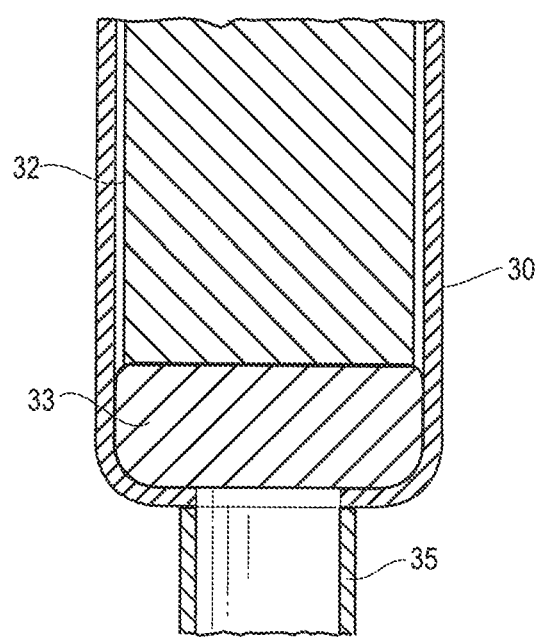
FIG. 3 is a fragmentary sectional view showing a portion of the embodiment of FIG. 1.

In some embodiments, the chamber 14 may have a variable volume, and may be the interior of the barrel 30 of a syringe, such as a gas-tight syringe. In some embodiments, the chamber 14 may be defined by the interior of the barrel 30 and a plunger 32 having a piston or other sealing element 42, shown in FIG. 3, at or near its lower end. The end of the barrel 30 disposed away from the penetration implement 16, i.e., the upper end or distal end, may have a flared annular barrel flange 34 to facilitate longitudinal stabilization of the barrel during use. The end of the barrel 30 disposed toward the penetration implement 16, i.e., the lower end or proximal end, may have an adapter 35 configured to fit the first valve 24 or the second valve 26 with little or no leakage. The plunger 32 may have a flange 36 or other means to facilitate manually pulling the plunger upward and pushing it downward. Prior to the penetration implement 16 producing an opening in the metal closure 18 of the container 12, the barrel 30 and the plunger 32 may be in a first, closed position, i.e., a lower position as shown in FIG. 1, the such that bottom 42 of the plunger engages the bottom of the barrel, with little or no air in the barrel below the plunger.

After the penetration implement 16 creates an opening in the metal closure 18 of the container 12, the first valve 24 (if present) and the second valve 26 may be moved to open positions to allow flow of gas between the penetration implement 16 and the chamber 14, but prevent flow elsewhere. The plunger 32 in the barrel 30 of the chamber 14 may be pulled upward to a second position such that gas from the container 12 is withdrawn through the penetration implement into the barrel. Once the gas is withdrawn the first valve 24 and/or the second valve 26 may be closed to prevent flow therethrough. The penetration implement 16 may then be removed from the container 12.

In embodiments where the second valve 26 is connected to the penetration implement 16 without the use of a first valve 24, the penetration implement may be removed from the second valve by disengaging the Luer lock connector 20, In such embodiments, the penetration implement 16 may not need to be removed from the container 12.

In some embodiments, the volume of the barrel 30 may be 5 to 95 mL, 30 to 70 mL, 40 to 60 mL or about 50 mL. The volume of the barrel may allow for reduction in the complexity of the withdrawal process. For example, when a container is hot-filled with food product that was submitted to pasteurization or sterilization treatments, the pressure in the container reduces to below normal atmospheric pressure (i.e., a vacuum is created) when the food product and container cool. Withdrawing headspace gas from the container with a syringe with a longer penetration implement may increase the risk of the food product being withdrawn with the headspace gas. However, a syringe with a shorter penetration implement may allow for enough headspace gas to be withdrawn to sufficiently sample the headspace gas without an increased risk of withdrawal of food product.

In some embodiments, the penetration implement 16 may be made from stainless steel which may contain, for example, iron, chromium, manganese, silicon, carbon, nickel, molybdenum, or the like. When hydrogen sulfide ($H_2S$) is a component of the headspace gas that is withdrawn from the container, iron in the stainless steel may react with the $H_2S$ to form an iron sulfide, which may obstruct the penetration implement from further withdrawal of gas. When a small penetration implement is used, such as that associated with a 50 mL barrel, the reaction may be avoided so that the penetration implement may not be obstructed by iron sulfide.

In some embodiments, the temperature of the food product in the container 12 may be measured by a thermocouple, thermometer, or other temperature sensor after the penetration implement 16 is removed.

In some embodiments, the amount of headspace gas in the container 12 may be less than 50 mL. The sample of withdrawn headspace gas may need to be diluted with a dilution gas, such as air, to a set volume after withdrawal from the container. In some embodiments, the dilution gas may be nitrogen, argon, or another type of gas, alone or in combination.

To dilute the sample, the second valve 26 may be actuated to a position to allow flow of the dilution gas into the chamber through the first valve. In some embodiments, the penetration implement 16 may be removed before dilution. In other embodiments, it may remain in place. In some embodiments, the chamber and associated elements may be moved away from the container prior to dilution of the sample. In other embodiments, chamber and associated elements may remain in place, and dilution may be facilitated by creating a second opening in the closure, outside of the seal.

In embodiments where only a second valve is used, the bottom opening of the second valve may be externally obstructed after the penetration implement is removed until the plunger 32 is pulled upward to a third position to draw dilution gas into the chamber 14 to prevent or limit loss of portions of the headspace gas sample prior to dilution. The drawn dilution gas may be at room temperature or may be at a temperature less than room temperature. In embodiments where a first valve is used, the first valve 24 may be opened, and the plunger 32 then pulled upward to the third position to draw the dilution gas into the chamber 14. Once the desired amount of dilution gas is drawn into the chamber to dilute the sample to a set volume, the first valve 24 and/or the second valve 26 may be closed.

After the sample is diluted, a second end 44 of the gas detection tube 38 may be removed (in the same way that the first end was removed, or in a different way) to allow the tube 38 to receive at least part of the diluted sample of withdrawn gas from the chamber 14. When the second valve 26 is moved to a position to allow diluted gas to flow from the chamber 14 into and through the connection pipe 28, the plunger 32 is pushed down into the barrel 30 so that the barrel returns essentially to the first, closed position, which pushes diluted gas from the chamber 14 to the gas detection tube 38 through the connection pipe 28.

In some embodiments, the detection tube 38 may include graduated marks 42. When the diluted gas sample reacts with a chemical reagent inside the gas detection tube, a color change may occur. At the conclusion of the sampling time, the amount of detected gas in the diluted gas sample may be estimated or calculated by measuring a length of the color change using the graduated marks 42. Specifically, the measurement of the length of color change from the graduated marks 42 is multiplied by a dilution factor ($V_f/V_i$, wherein $V_f$ is the final volume of the sample and $V_i$ is the initial volume of the sample) to determine the concentration of the detected gas. In some embodiments, the wait time for the complete reaction of the chemical reagent in the gas detection tube 38 and the diluted gas sample may be less than 3 minutes, less than 2 minutes, or about 1 minute. The concentration of detected gas may be calculated from the measurement on the gas detection tube 38 and the known volume of the diluted gas sample.

In some embodiments involving analysis of a gas that is a component of the atmosphere, the process for measuring the concentration of a gas in the container may occur in a controlled environment, such as a glove box. For example, if nitrogen, oxygen, argon, carbon dioxide, neon, helium, methane, krypton, dinitrogen oxide, hydrogen, or xenon is analyzed, then a controlled environment may be needed. Prior to measuring the concentration of gas in the headspace of the container, the concentration of that same gas in the surrounding atmosphere may need to be measured, then calculated out of the concentration of the diluted gas sample.

In some embodiments, the diluted gas sample is not directed into a detector tube but into a vial for analysis at a later time. For example, connection pipe 28 may be fitted with a second Luer lock connector. A needle may be mated with second Luer lock connector. After a sample is drawn from the headspace of a container and diluted (as described above), a vial may be coupled to the needle. For example, a pre-evacuated vial may have a septum which the needle penetrates to access the interior of the vial. When the barrel of the syringe returns essentially to the first, closed position, the diluted gas sample may be pushed from the chamber to the vial through the connection pipe and needle. The needle may then be withdrawn from the vial. The diluted sample in the vial may be analyzed at a later time in a gas chromatograph.

Figure 2:
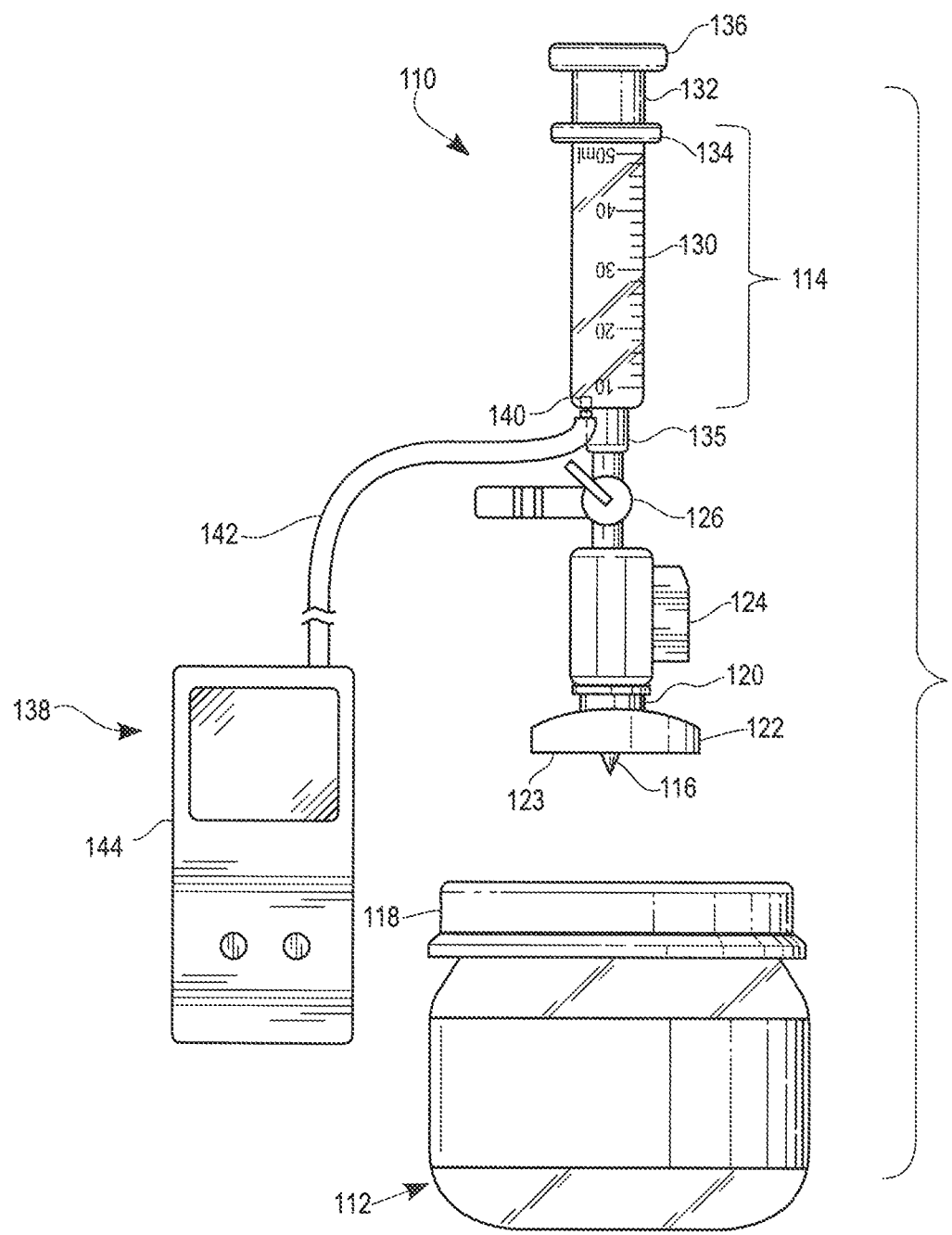
FIG. 2 illustrates a second embodiment of a gas analysis system.

Referring to FIG. 2, a second embodiment of the gas analysis system 110 is shown and is identical to the first embodiment except as described below. This second embodiment of the gas analysis system 110 further includes an optical sensor system 138 for measuring concentrations of gas. The optical sensor system 138 includes an optical sensor 140, a polymer optical fiber 142, and a receiver 144. The optical sensor 140 may reside inside the chamber 114. The optical sensor 140 may be positioned on the inside of the barrel 130 where the optical sensor will be exposed to the sample gas once the gas is withdrawn. In some embodiments, the optical sensor may be disposed near the bottom of the chamber near the penetration implement 116. For example, the optical sensor may be between 0 mm and 75 mm, 0 mm and 50 mm, 0 mm and 25 mm, or 0 mm and 10 mm, from the bottom of the chamber 114. Placement near the bottom of the chamber and near the penetration implement may prevent the optical sensor 140 from interfering with operation of the plunger 132. In some embodiments, the optical sensor 140 may be positioned on the inside wall of the chamber closer to the plunger 132.

In a fashion similar to the first embodiment, the penetration implement 116 creates an opening in the closure 118 of container 112. The seal 122 and gas-tight valves 124, 126 may limit or prevent the headspace gas from escaping. The plunger 132 and the penetration implement 116 may withdraw gas from the headspace of the container 112 through the opening in the metal closure 118. Once the headspace gas is withdrawn, the polymer optical fiber 142 may be placed near the outside the wall of the chamber 114 near where the optical sensor 140 is positioned inside the chamber.

In some embodiments, the polymer optical fiber 142 may be in contact with the outside wall of the chamber 114. In other embodiments, the polymer optical fiber may be positioned 0 mm to 5 mm, 0 mm to 3 mm, 0 mm to 2 mm, or about 1 mm away from the outside wall of the chamber.

In some embodiments, the polymer optical fiber 142 may include a core surrounded by a cladding surrounded by a coating. The core may carry light to and from the optical sensor 140 to obtain a measurement of concentration of a gas in the container 112. The cladding may be of a lower refractive index than the core to allow the light to be confined to the core. The coating may help protect the cladding from scratches, nicks, scrapes, moisture damage, and other injuries.

Once the polymer optical fiber is in place, the concentration of the detected gas may be read from the receiver 144, which is operatively connected to the polymer optical fiber 142. In some embodiments, the receiver may have a length of less than about 20 cm and a width of less than about 15 cm. In some embodiments, the receiver may weigh less than about 850 g. In some methods, the receiver does not need to be held during operation of the system but may be placed on a surface to allow the user to operate the system with both hands if desired.

In some embodiments where the optical sensor system is employed, only the first valve 124 is employed and the second valve 126 is not needed. The headspace gas sample that is withdrawn may not need to be diluted when an optical sensor system is employed to measure the concentration of a particular gas in the headspace. In some embodiments, a small volume of headspace gas sample, such as about 10 mL, about 9 mL, about 8 mL, about 7 mL, about 6 mL, about 5 mL, about 4 mL, about 3 mL, about 2 mL, or about 1 mL, is sufficient to obtain an accurate measurement.

Those skilled in the art will recognize that a wide variety of modifications, alterations, and combinations may be made with respect to the above described embodiments without departing from the scope of the invention, and that such modifications, alterations, and combinations are to be viewed as being within the ambit of the inventive concept.

What is claimed is:

1. A gas analysis system, that is portable and capable of being handheld, for engaging a sealed container to withdraw and analyze gas from the sealed container, the gas analysis system comprising:
   a penetration implement configured to create an opening to permit withdrawal of gas from the sealed container;
   a chamber operatively coupled to the penetration implement for receiving gas from the sealed container;
   a gas analyzer;
   a seal configured to engage the sealed container to enable the gas analysis system to maintain an enclosed volume comprising the chamber and an interior of the sealed container after the penetration implement has created an opening in the sealed container, wherein the seal comprises a suction cup; and
   a mechanism to effect flow of gas from the sealed container to the chamber, and thereafter from the chamber to the gas analyzer, the mechanism comprising a first valve operatively coupled to the penetration implement, and a connection pipe configured to connect with the gas analyzer;
   wherein the first valve is movable between a first position in which it permits flow of gas from the sealed container to the chamber, and prevents gas from escaping from the enclosed volume or being contaminated, and a second position in which the first valve permits flow of gas from the chamber to the connection pipe and the gas analyzer;
   wherein the mechanism further comprises a syringe, and wherein the chamber comprises a barrel of the syringe;
   the gas analysis system further comprising:
   a second valve operatively connected to the penetration implement and the first valve, the first valve positioned closer to the chamber than the second valve,
   wherein the second valve is movable between a third position in which it prevents flow of gas from the sealed container to the chamber, and prevents loss of gas from the sealed container by creating an enclosed volume, and a fourth position in which the second valve permits flow of gas from the sealed container to the chamber.

* * * * *